(12) United States Patent
Brosche

(10) Patent No.: US 12,158,539 B2
(45) Date of Patent: Dec. 3, 2024

(54) METHOD FOR DETECTING ANGLE MEASURING ERRORS IN A RADAR SENSOR

(71) Applicant: Robert Bosch GmbH, Stuttgart (DE)

(72) Inventor: Thomas Brosche, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 753 days.

(21) Appl. No.: 17/262,897

(22) PCT Filed: May 25, 2019

(86) PCT No.: PCT/EP2019/063557
§ 371 (c)(1),
(2) Date: Jan. 25, 2021

(87) PCT Pub. No.: WO2020/048649
PCT Pub. Date: Mar. 12, 2020

(65) Prior Publication Data
US 2021/0165074 A1   Jun. 3, 2021

(30) Foreign Application Priority Data
Sep. 4, 2018   (DE) .......................... 102018214961.5

(51) Int. Cl.
*G01S 7/40*        (2006.01)
*G01S 7/41*        (2006.01)
(Continued)

(52) U.S. Cl.
CPC ............ *G01S 7/4026* (2013.01); *G01S 7/415* (2013.01); *G01S 13/589* (2013.01);
(Continued)

(58) Field of Classification Search
None
See application file for complete search history.

(56) References Cited

U.S. PATENT DOCUMENTS

2018/0024228 A1 * 1/2018 Schiffmann ............. G01S 13/86
                                                        342/174
2018/0102414 A1   4/2018 Liu et al.

FOREIGN PATENT DOCUMENTS

CN    102288957 A    12/2011
DE    102011015935 A1  10/2012
(Continued)

OTHER PUBLICATIONS

DE102015116441 translation (Year: 2015).*
(Continued)

*Primary Examiner* — Whitney Moore
(74) *Attorney, Agent, or Firm* — NORTON ROSE FULBRIGHT US LLP; Gerard A. Messina

(57) ABSTRACT

A method for detecting angle measuring errors in an angular-resolution radar sensor for motor vehicles. For stationary radar targets, in each instance, the radial velocity and at least one locating angle are measured, and with the aid of the measured locating angle, an expected value of the radial velocity is calculated and compared to the measured value. Measurements of the radial velocities and the locating angles for one or more stationary targets are taken. For each of these targets, an individual indicator value is calculated, which indicates the difference of the measured radial velocity from the expected radial velocity. The individual indicator values obtained are subjected to angle-dependent scaling to compensate for the angular dependence of distortive angle errors. An indicator of the angle measuring error is calculated from the scaled, individual indicator values.

6 Claims, 5 Drawing Sheets

(51) Int. Cl.
*G01S 13/34* (2006.01)
*G01S 13/58* (2006.01)
*G01S 13/931* (2020.01)

(52) U.S. Cl.
CPC ............ *G01S 13/931* (2013.01); *G01S 7/403* (2021.05); *G01S 7/4034* (2021.05); *G01S 7/4039* (2021.05); *G01S 13/343* (2013.01); *G01S 2013/932* (2020.01)

(56) References Cited

FOREIGN PATENT DOCUMENTS

| DE | 102014223461 A1 | 5/2016 |
|---|---|---|
| DE | 102015116434 A1 | 3/2017 |
| DE | 102015116441 A1 | 3/2017 |
| EP | 3279683 A1 | 2/2018 |
| JP | 2002228749 A | 8/2002 |
| JP | 2007139690 A | 6/2007 |
| JP | 2011064624 A | 3/2011 |
| JP | 2017198715 A | 11/2017 |
| KR | 20140077155 A | 6/2014 |
| WO | 2015037173 A1 | 3/2015 |

OTHER PUBLICATIONS

International Search Report for PCT/EP2019/063557, Issued Sep. 9, 2019.

Jungyan, et al.: "A Study of Radial Velocity Checking Methods for Radar," Radar Science and Technology, 10( 3), (2012), pp. 1-4.

Renga and Moccia: "Use of Doppler Parameters for Ship Velocity Computation in SAR Images," IEEE Transactions on Geoscience and Remote Sensing, 54(7), (20160, pp. 1-17.

Zong Rui: "A Study of Online Compensation Method of Guide Head Radome Error and Phased Array Guide Head Beam Pointing Error," China Doctoral Dissertations, Database, Engineering Science and Technology, (2016), pp. 1-195.

Sun Duo, et al.: "Locomotive Doppler Velocity Measurement Radar Beam Direction Correction Method," Fire Control Radar Technology, 38(1), (2009), pp. 1-5.

* cited by examiner

METHOD FOR DETECTING ANGLE MEASURING ERRORS IN A RADAR SENSOR

FIELD

The present invention relates to a method for detecting angle measuring errors in an angular-resolution radar sensor for motor vehicles, where, in each instance, the radial velocity and at least one locating angle is measured for stationary radar targets and, with the aid of the measured locating angle, an expected value of the radial velocity is calculated and compared to the measured value.

BACKGROUND INFORMATION

In motor vehicles, radar sensors are used for measuring the distance, relative radial velocity and angle of physical objects. The objective is to support comfort and safety functions, optionally, in conjunction with further suitable sensor systems (e.g., ultrasonic, video or lidar). In a radar measurement, physical objects may have one or more target reflections at different positions, in particular, in the case of elongated objects and/or high resolving capability of the radar sensors.

Radar sensors of today are mostly FMCW (frequency modulated continuous wave) radar sensors having fast-chirp modulation, that is, rapid, wide-band ramps having ramp times of 10 µs to several tens of µs, that is, a large slope of the FMCW modulation ramps, which means that the Doppler component within one ramp may be neglected by approximation. Consequently, the distance information is substantially obtained by evaluating the individual ramps. In addition, a measuring cycle mostly includes a plurality of (e.g., 256) ramps with, e.g., 512 sampling values per ramp. The evaluation of the temporal change in the phase angle at corresponding sampling points from ramp to ramp then yields an additional, independent information item about the Doppler frequency (velocity) of targets and/or target reflections, and is accomplished, generally, using a two-dimensional Fourier transformation.

MIMO (multiple input multiple output) antenna systems, which have a plurality of transmit and receive channels, are increasingly being used for estimating angles. As a rule, the transmit channels are separated by time division multiplexing (TDM) methods. However, other methods, such as frequency division multiplexing (FDM), code division multiplexing (CDM), or OFDM-based radar systems, are also possible.

The angle evaluation is normally based on the evaluation of the echo-time and/or phase differences between different receive channels or, in the case of MIMO, between different transmit and receive channel combinations. In their effect, the transmit and receive channel combinations may also be regarded as an equivalent virtual array having only one transmit channel and/or as virtual receive channels.

A method by which misalignment of a radar sensor may be detected and the corresponding misalignment angle may be estimated and compensated for, is described in German Patent Application No. DE 10 2014 223 461 A1. In this case, the misalignment angles are the angles of deviation in azimuth and elevation, which are the same for all of the angles to be estimated. An angle-dependent angle error is not considered.

However, during estimation or measurement of angles, so-called distortive errors may also occur, which are caused, e.g., by refraction of the radar waves by unforeseen sources of interference, e.g., by a coating (ice, snow, etc.) on the radar sensor and/or radome, or in the event of indirect, poor installation of the radar sensor, e.g., behind an unsuitable bumper (e.g., after replacement of the bumper subsequent to being jostled during parking, after being repainted, etc.). In the case of such distortive angle measuring errors, the difference between the true and the measured locating angle is, for its part, a function of angle.

SUMMARY

An object of the present invention is to provide a method, by which the presence of distortive angle measuring errors may be detected.

This object of the present invention may be achieved in accordance with an example embodiment of the present invention. In accordance with an example embodiment, the method includes taking measurements of the radial velocities and the locating angles for one or more stationary targets; calculating an individual indicator value for each of these targets, which indicates the difference of the measured radial velocity from the expected radial velocity; subjecting the obtained, individual indicator values to angle-dependent scaling to approximately compensate for the angular dependence of distortive angle errors; and calculating an indicator of the angle measuring error from the scaled, individual indicator values.

Neglecting pitch, roll and yaw of the vehicle, the sensitivity of the individual indicator values in the principal beam direction (on the optical axis) of the radar is 0 and increases with greater angular deviations.

The angular dependence of the sensitivity of the individual indicator values for distortive angle errors may be calculated and compensated for at least approximately by angle-dependent scaling, so that via averaging or summation over the entirety of the radar targets considered, an overall indicator is obtained, which is substantially independent of the more or less random angular distribution of the regarded radar targets and indicates the presence of distortive angle errors, as well as their degree. In particular, distortive angle errors may also be detected in this manner, when no misalignment error is present and, consequently, a value near zero of the angular deviation averaged over all of the targets were to be expected.

With the aid of the indicator obtained in this manner, the accuracy and reliability of the obtained angle measuring results may be estimated and taken into account appropriately in the assistance functions, based on these measuring results.

Advantageous embodiments and refinements of the present invention are described herein.

In one specific embodiment of the present invention, the angle-dependent scaling of the parameters takes place in a two-dimensional angle space, for example, in azimuth and in elevation.

As an alternative, the measuring results may also be evaluated with regard to, for instance, present misalignment errors, e.g., in accordance with the method described in German Patent Application No. DE 10 2014 223 461 A1. If the misalignment errors are then known, they may be taken into consideration in the calculation of the expected radial velocities, so that the accuracy in the case of detection of distortive errors is improved.

In the case of FMCW radar, in which the frequency of the transmitted radar signal in consecutive measuring intervals is modulated in a ramp-shaped manner, it is useful to determine the individual indicator values on the basis of measured values, which are obtained for the different radar targets within the same measuring interval. However, it is also possible to subject the individual and/or overall indicator values to temporal filtering, using, for example, an IIR filter, FIR filter, Kalman filter, quantile, and the like, so that the current indicator values are linked to corresponding values from preceding measuring intervals and, consequently, time characteristics may be identified more effectively, and the accuracy may be increased further.

With the aid of conventional tracking procedures, it is also possible to track the relative motions of considered radar targets over several measuring periods and compare them to the specific motion of the vehicle. In this manner, it is often possible to separate, from each other, the components of the differences between measured and expected radial velocity, which originate from, on one hand, distortive azimuth angle errors and, on the other hand, distortive elevation angle errors, which means that quantitative determination of and compensation for the distortive angle errors is also enabled. This is possible, for example, by doing a synthetic aperture radar (SAR) evaluation, which is based on the time characteristic of the Doppler frequency, and by comparing the target positions in the SAR result to the target positions ascertained in light of the radar measurement (target distance, azimuth and elevation angles).

In the following, exemplary embodiments of the present invention are explained in greater detail with reference to the figures.

DETAILED DESCRIPTION OF EXAMPLE EMBODIMENTS

Figure 1:
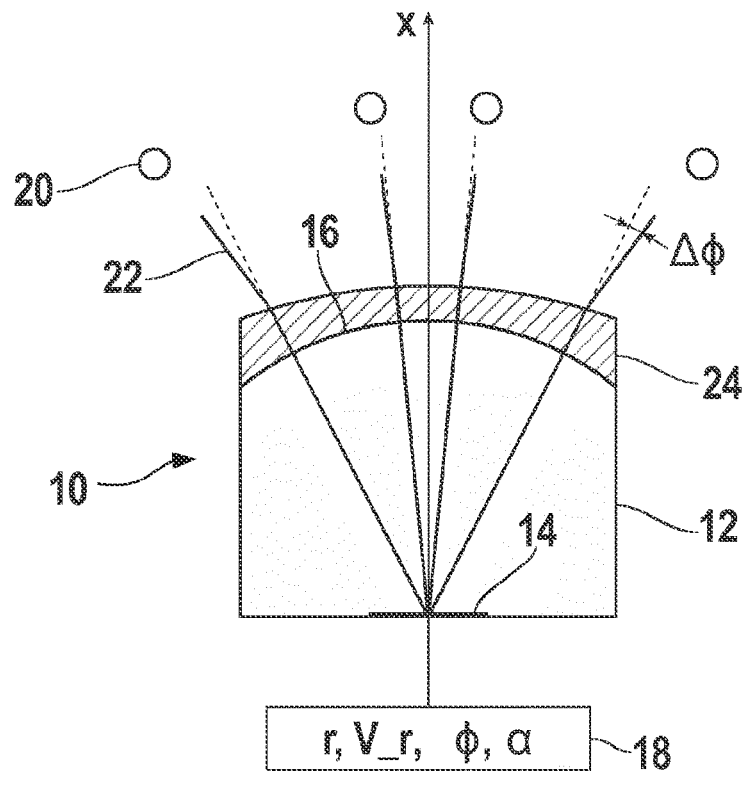
FIG. 1 shows a sketch for illustrating distortive angle errors at a radar sensor.

A horizontal section of a radar sensor 10 having a housing 12 is shown schematically in FIG. 1; the housing containing a MIMO antenna array 14 and being delimited on a transmitting and receiving side by a radome 16. A control and evaluation device 18 is connected to antenna array 14, the control and evaluation device being used to control the functions of the radar sensor and to determine, with the aid of the received radar echoes, the distances r, relative velocities V_r (radial velocities), azimuth angles $\varphi$, and elevation angles $\alpha$ (referred to in summary as the locating angles) of radar targets 20 situated in the locating range. The radar beams 22 reflected by four radar targets 20 and received again by antenna array 14 are drawn in schematically.

As an example, it is assumed that a coating 24, e.g., an icy crust, at whose upper surface radar beams 22 are refracted, is situated on radome 16, which means that during the angle measurement (in this case, azimuth), a distortive angle measuring error $\Delta\varphi$ occurs. It is apparent that radar beams 22 are refracted by film 24 to different degrees and in different directions, which means that the magnitude and algebraic sign of distortive angle measuring errors $\Delta\varphi$ are a function of the position of specific radar target 20 relative to radar sensor 10.

Radar sensor 10 is installed in the front end of a motor vehicle and is used, in particular, for tracking vehicles traveling ahead, as well as other obstacles in the near field of the vehicle. In this context, in the normal case, the radar sensor is aligned in such a manner, that its optical axis coincides with the x-axis, which indicates the forward direction or direction of travel of the motor vehicle.

Figure 2:
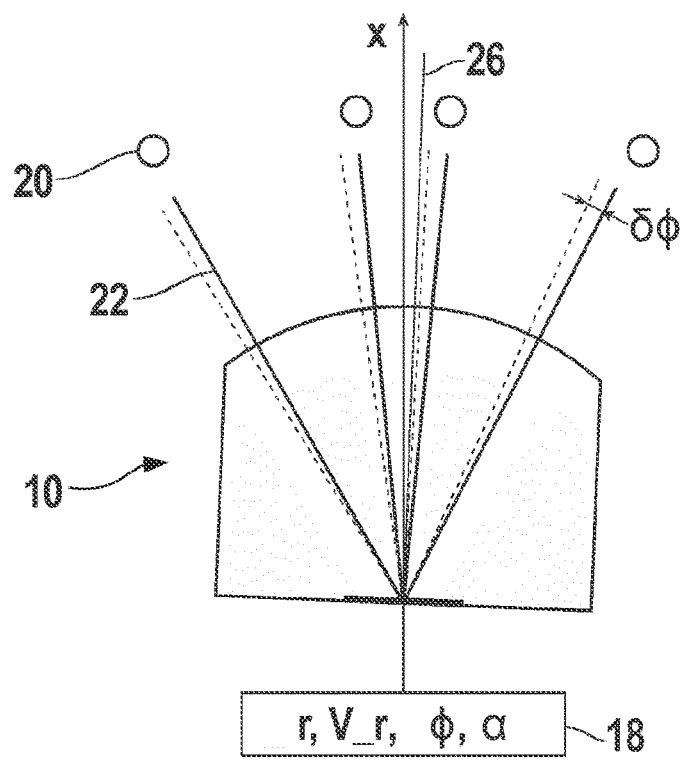
FIG. 2 shows a sketch for illustrating a misalignment error.

By way of comparison, FIG. 2 shows a situation, in which no distortive angle error occurs, but radar sensor 10 is not correctly aligned, which means that its optical axis 26 deviates from the x-axis in the azimuth. The result is that azimuth angles $\varphi$ measured for the different radar targets 20 have a misalignment error $\delta\varphi$. However, unlike distortive angle measuring error $\Delta\varphi$, misalignment error $\delta\varphi$ has the same algebraic sign and the same magnitude for all targets 20.

In the following, a method is described, by which the presence of such angle measuring errors, in particular, the distortive angle measuring errors shown in FIG. 1, may be detected reliably.

Figure 3:
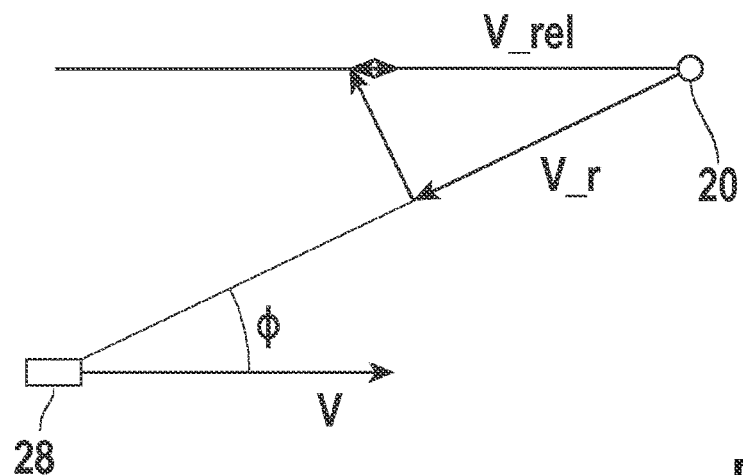
FIGS. 3 and 4 show sketches for illustrating the dependence of the radial velocity of a radar target on the locating angle.

A motor vehicle 28, which moves past a stationary radar target 20, for example, a traffic sign standing on the side of the road, is represented in a sketch in FIG. 3. Specific velocity V of the motor vehicle is drawn in as a vector. A vector V_rel=–V indicates the relative velocity of radar target 20 relative to motor vehicle 28. In the following, it is assumed, for the sake of simplicity, that the moving direction of the antenna of the radar sensor installed in the motor vehicle coincides with the moving direction of the rear axle of the vehicle. In general, the direction of the actual, specific velocity of antenna 14 may deviate, however, from the x-axis of the coordinate system as a function of the mounting location of radar 10 in vehicle 10, due to pitching motions, rolling motions, and rotary motions about the vertical vehicle axis (yaw). This must be appropriately taken into account by using actual velocity V of the antenna at its mounting location and correspondingly corrected angle measuring values (($\varphi$, $\alpha$) and/or ($\alpha$, $\beta$) are the angles between the actual moving direction of the antenna array and the respective target), or the evaluation is limited to driving situations having negligible pitching, rolling and yawing motions.

Radar target 20 is located by the radar sensor 10 installed in the front end of motor vehicle 28 (and not shown in FIG. 3). In the situation shown in FIG. 3, a relatively small locating angle (azimuth angle) $\varphi$ is measured for this target. Vector V_r may be broken down into a radial component along the line of sight between the radar sensor and the radar target, and a transverse component perpendicular to it. The magnitude of the radial component is radial velocity $V\_r=\cos(\varphi)*V$, where V is the magnitude of the specific velocity of the motor vehicle, that is, of the antenna, above ground and, simultaneously, the magnitude of relative velocity V_rel.

Figure 4:
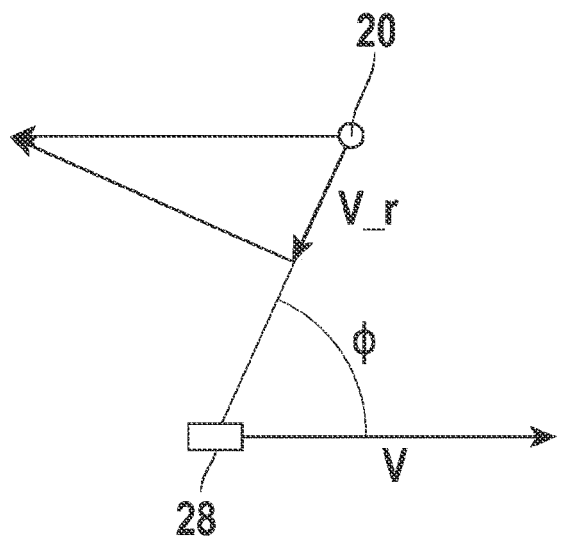

FIG. 4 shows the situation at a later time, when azimuth angle $\varphi$ has increased and radial velocity V_r has correspondingly decreased in relation to specific velocity V.

If it is known that radar target 20 is a stationary target, and if specific velocity V of the vehicle, that is, in particular, of the antenna array at the respective mounting location, is additionally known, for example, on the basis of direct measurement by wheel speed sensors on the vehicle, on the basis of the yaw rate, etc., then V_r may be calculated according to the formula V_r=cos(φ)*V indicted above. On the other hand, V_r may also be measured directly, on the basis of the Doppler effect, with the aid of radar sensor 10. A comparison of the measured to the calculated value enables a check as to whether the measurement of the azimuth angle φ was correct.

In FIGS. 3 and 4, only two spatial dimensions are taken into account. When all three spatial dimensions are considered, then radial velocity V_r is also a function of elevation angle α of radar target 20, namely, according to the formula:

$$V\_r = \cos(\alpha) \cdot \cos(\varphi) \cdot V. \tag{1}$$

Figure 5:
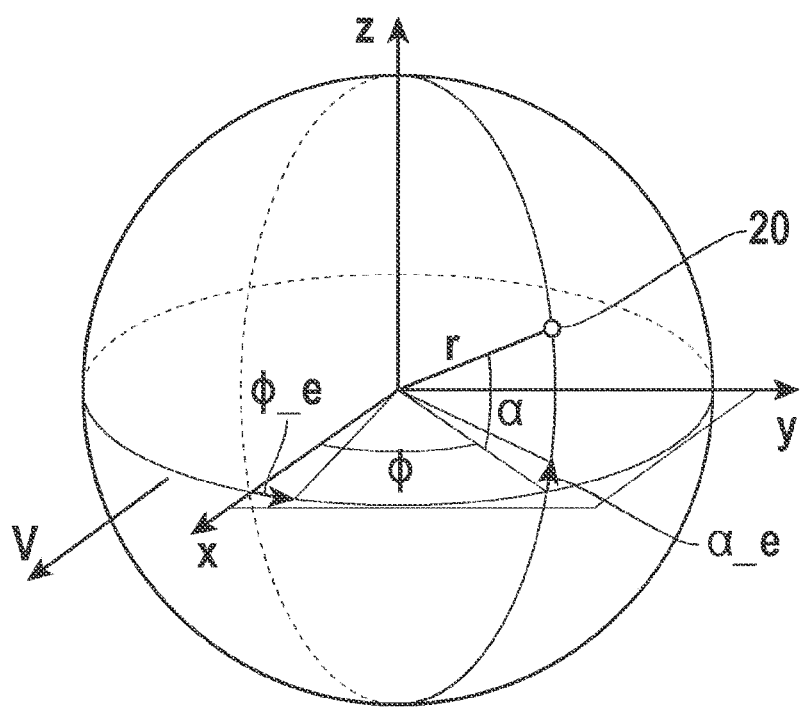
FIG. 5 shows a diagram for illustrating the angle relationships for a radar target in a spherical coordinate system.

FIG. 5 shows radar target 20 in a three-dimensional Cartesian coordinate system having axes x, y, and z. In spherical coordinates, the position of radar target 20 is given by radius r, azimuth angle φ and elevation angle α. For the sake of simplicity, vectorial specific velocity V of the motor vehicle or antenna array is represented as parallel to the x-axis in FIG. 5 and FIG. 6. In addition, a possible azimuthal angle measuring error φ_e and a possible elevation angle measuring error α_e are drawn in.

The following equations are valid for converting spherical coordinates to Cartesian coordinates:

$$x = r \cdot \cos(\varphi) \cdot \cos(\alpha)$$

$$y = r \cdot \sin(\varphi) \cdot \cos(\alpha)$$

$$z = r \cdot \sin(\alpha)$$

Figure 6:
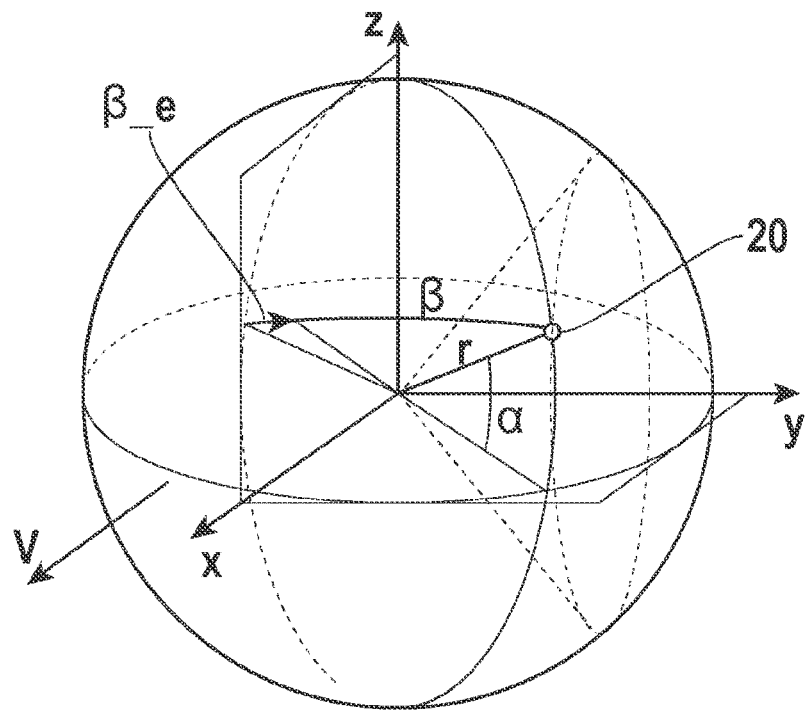
FIG. 6 shows a diagram for illustrating the angle relationships for a radar target in a conical coordinate system.

Alternatively, as shown in FIG. 6, conical coordinates (r, β, α) may also be used in place of the spherical coordinates shown in FIG. 5. In conical coordinates, elevation angle α has the same meaning as in spherical coordinates. It indicates the angle between the location vector of radar target 20 and the xy-plane. However, in conical coordinates, azimuth angle φ is replaced by angle β, which indicates the angle between the location vector of the radar target and the xz-plane. Thus, the following applies for conversion to Cartesian coordinates:

$$x = r \cdot (\cos^2(\alpha) \cdot \sin^2(\beta))^{1/2}$$

$$y = r \cdot \sin(\beta)$$

$$z = r \cdot \sin(\alpha)$$

An example of a possible angle measuring error β_e is drawn in, as well.

Figure 7:
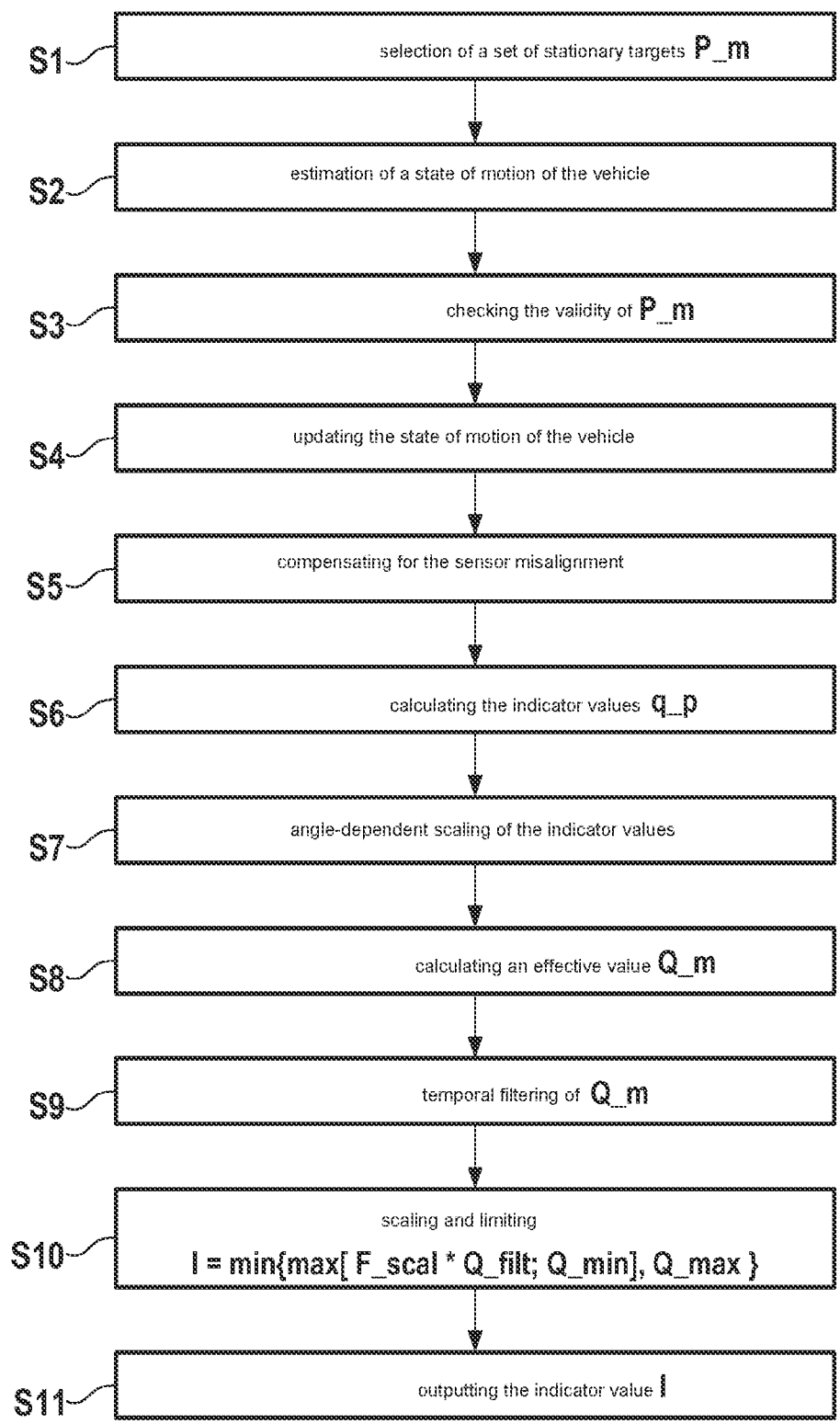
FIG. 7 shows a flow chart for illustrating important steps of a method according to an example embodiment of the present invention.

In principle, angle measuring errors φ_e, α_e, β_e may be misalignment errors and/or distortive errors. Methods for detecting misalignment errors as such are conventional. In order to detect distortive errors, as well, for example, the method represented as a flow chart in FIG. 7 may be executed.

The number of the stationary targets located in a given measuring cycle is denoted by R_m (m is an index, which indicates the measuring cycle). Criteria for distinguishing between stationary and moving targets are conventional and include, in particular, the comparison of the measured relative velocity of the target to the specific velocity of the vehicle. In step S1, a subset P_m is selected from set R_m, the subset being intended to be used to check for distortive measuring errors. The number N_m of selected targets should be so large, that a certain degree of compensation for statistical fluctuations is attained. In addition, the selected targets should be distributed as uniformly as possible over as large a solid angle as possible.

In step S2, the state of motion of reference motor vehicle 28 is estimated, for example, on the basis of signals of wheel speed sensors. Thus, in the coordinate system according to FIG. 5 or FIG. 6, an estimate of vector V is obtained, which indicates the specific motion of the vehicle and, consequently, of the antenna of the radar sensor installed in the vehicle. The result of estimating step S2 may simultaneously form the basis of the identification of stationary targets in step S1 of the next measuring cycle.

In a further step S3, the validity of the targets selected in step S1 is preferably checked once more. In particular, in view of the specific motion of the vehicle and, in particular, of the antenna, which was determined in step S2. In this context, criteria include, for example, a minimum specific velocity of the vehicle and/or of the radar sensor above ground, the acceleration and yaw rate of the reference vehicle, the number of elements (targets) in P_m, and the spread of the angle measuring data.

In a further optional step S4, the data, which indicate the specific motion of the vehicle, are verified and possibly updated in light of the radar data obtained in the current and, in some instances, preceding measuring cycles.

In the example considered here, it should also be assumed that independently of the check for distortive angle errors, a check for misalignment errors also takes place, optionally, on the basis of measurement data for the targets selected in step S1.

In step S5, the measurement data for the locating angles (e.g., φ and α) are then corrected in view of the detected sensor misalignment, which means that the subsequent check for distortive errors may take place on the basis of more accurate angle measuring data.

In step S6, an indicator value q_p, which constitutes a measure of the deviation of calculated radial velocity V_r from the radial velocity actually measured on the basis of the Doppler effect, is then calculated for each individual target in set P_m (the targets are identified with the aid of an index p). In this context, the starting point is equation (1). However, it is useful to distinguish between the approach and the moving-away of the radar target, by allowing V_r to take on negative values when the target approaches. Then, the following applies in spherical coordinates:

$$-V\_r/V = \cos(\alpha) \cdot \cos(\varphi) = \cos(\underline{\alpha} - \alpha\_e) \cdot \cos(\underline{\varphi} - \varphi\_e) \tag{2}$$

where $\underline{\alpha}$ and $\underline{\varphi}$ are the measured values possibly containing errors and α_e and φ_e are the angle measuring errors.

The following applies analogously in conical coordinates:

$$-V\_r/V = (1 - \sin^2(\beta) - \sin^2(\alpha))^{1/2} = (\cos^2(\underline{\beta} - \beta\_e) - \sin^2(\underline{\alpha} - \alpha\_e))^{1/2} \tag{3}$$

If $\underline{\alpha}\_p$ and $\underline{\varphi}\_p$ are the measured locating angles of the target having index p and V_r_p is the measured radial velocity of this target, then a suitable indicator value q_p is given, for example, by:

$$q\_p = (-V\_r\_p/V) - \cos^2(\underline{\alpha}\_p) \cdot \cos(\underline{\varphi}\_p) \tag{4}$$

or in conical coordinates:

$$q\_p = (-V\_R\_P/V) - (\cos^2(\underline{\alpha}\_p) - \sin^2(\underline{\beta}\_p)) \tag{5}$$

However, different definitions of the indicator values are also possible, for example:

$$q\_p = (-V\_r\_p/V) - \cos^2(\underline{\alpha}\_p) \cdot \cos^2(\underline{\varphi}\_p) \tag{6}$$

and $$q\_p = (-V\_r\_p/V) - \cos^2(\underline{\alpha}\_p) + \sin^2(\underline{\beta}\_p) \tag{7}$$

Since the distortive angle measuring errors are a function of the angle, as was explained with the aid of FIG. 1, the indicator values obtained in step S6 will also be, theoretically, a function of the angle; that is, a different indicator value is obtained, in principle, for each target in P_m. Thus, the sum or the mean of the indicator values will generally be a function of the angular distribution of the targets, as well. In this instance, the indicator values may also take on different algebraic signs, and depending on the angular distribution of the targets, the mean of the indicator values may possibly lie close to zero and simulate a correct measurement, although in reality, a distortive measuring error is present.

Nevertheless, in order for a meaningful indicator of the presence of distortive errors to be obtained, angle-dependent scaling of the indicator values is carried out in step S7. To that end, (in the case of spherical coordinates) an arbitrary scaling function $F(\alpha, \varphi)$ or, in the case of conical coordinates, $F(\alpha, \beta)$ is defined, which represents the angular dependence of the distortive angle errors at least approximately. The scaling function may be, in turn, a function of the gradient $G(\alpha, \varphi) = -\sin(\alpha+\varphi)$:

$$F(\alpha,\varphi)=f[G(\alpha,\varphi)]=f[\sin(\alpha+\varphi)] \quad (8)$$

In the case of conical coordinates, a scaling function $F(\alpha, \beta)$ is formed, which may be, for example, a function $F(\alpha, \beta)=f[G(\alpha,\beta)]$ of the gradient $G(\alpha, \beta)$:

$$G(\alpha,\beta)=-[\sin(2\alpha)+\sin(2\beta)]*(2*[\cos(2\alpha)+\cos(2\beta)])^{-1/2} \quad (9)$$

Figure 8:
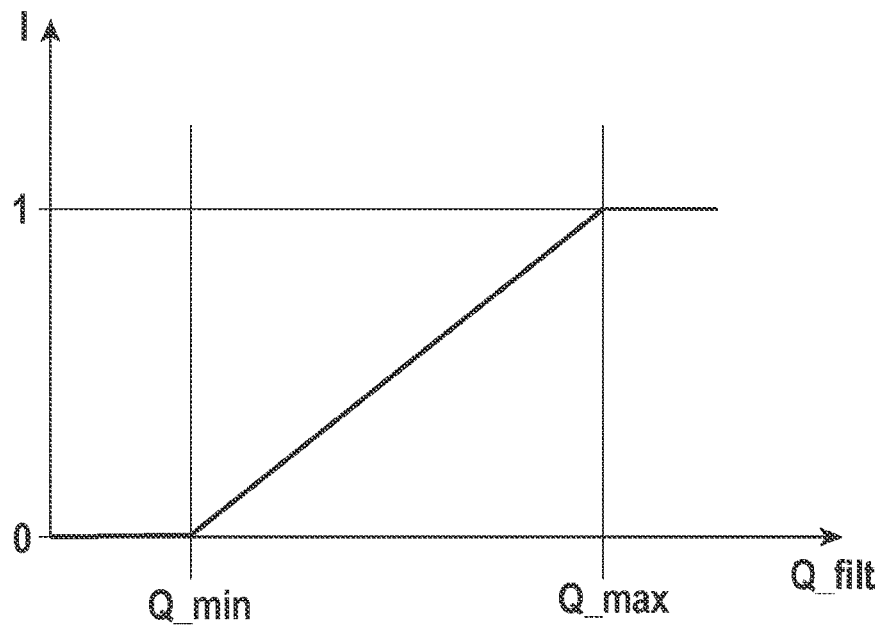
FIG. 8 shows a graph for illustrating a scaling and limiting function.

An effective value Q_m substantially independent of the angle is then calculated from indicator values q_p for the individual targets, for example, according to the following formula:

$$Q\_m=(\Sigma_p, |q\_p * F(\alpha,\varphi)|^2)/N\_m))^{1/2} \quad (10)$$

where the summation sign means a summation over all of the targets in P_m. In an optional step S9, the effective values obtained in consecutive measuring cycles in, in each instance, step S8 are then subjected to temporal filtering, in order to attain a higher stability with respect to statistical fluctuations. A filtered effective value Q_filt is obtained as a result of the filtering. Finally, in step S10, this filtered value is scaled, using a scaling factor F_scal, and limited by upper and lower limiting values Q_min and Q_max, so that in the end, an indicator value I is obtained, which varies linearly between 0 and 1 in accordance with the function shown in FIG. 8. In step S10, this indicator value I is then outputted to other modules of a driver assistance system, and in these modules, it permits an evaluation of the accuracy and reliability of the results of the angle measurements.

The information used for calculating indicator value I is independent of the phase information obtained in the receiving channels of antenna array 14 and forms a measure, which characterizes the angle errors and is independent of the classical angle estimation. In particular, angle errors or angular blindness of the radar sensor may also be detected, if the quality of the angle estimate is so high, that an error would not be deduced from the quality.

Assuming that elevation angle $\alpha$ is error-free, a correction value, which, apart from ambiguity in the algebraic sign, indicates azimuthal angle measuring error $\varphi\_e$ (in spherical coordinates) and $\beta\_e$ (in conical coordinates), may also be derived from equation (2) or (3) (by solving for $\varphi$ or $\beta$) Conversely, a correction value for the elevation angle may be derived, assuming that the azimuth angle is error-free.

What is claimed is:

1. A method for detecting angle measuring errors in an angular-resolution radar sensor for a motor vehicle, the method comprising the following steps:
    for each of a plurality of stationary radar targets:
        measuring a respective radial velocity and at least one respective locating angle;
        calculating a respective expected value of the radial velocity using the respective measured locating angle;
        comparing the respective expected value to the respective measured radial velocity; and
        calculating an individual indicator value, which indicates a difference of the respective measured radial velocity from the respective expected radial velocity;
    subjecting the individual indicator values to angle-dependent scaling by respective scaling values determined as a function of at least one considered angular direction such that, for at least any two of the individual indicator values that correspond to different ones of the stationary radar targets that are located at different relative angles relative to the motor vehicle with respect to a first of the at least one considered angular direction, but have the same relative angles relative to the motor vehicle in all other angular directions, the scaling values used for the scaling of the two individual indicator values are different than each other due to a difference between the relative angles of the respective stationary radar targets, with respect to the first of the at least one considered angular direction, to which the two individual indicator values correspond, the scaling thereby compensating for angular dependence of distortive angle errors; and
    calculating an indicator of the angle measuring error from the scaled individual indicator values.

2. The method as recited in claim 1, wherein the method is used for a FMCW radar, in which a frequency of a radar signal in consecutive measuring intervals is modulated in a ramp-shaped manner, wherein the calculation of the individual indicator values is carried out based on measurement results which are obtained within the same measuring interval.

3. The method as recited in claim 2, where after the angle-dependent scaling, the individual indicator values are combined to form an effective value, effective values obtained in consecutive measuring intervals are subjected to temporal filtering, and the indicator is calculated taking into consideration a result of the filtering.

4. The method as recited in claim 1, where the angle-dependent scaling takes place in a two-dimensional angle space.

5. The method as recited in claim 1, where a misalignment error of the radar sensor is detected and corrected using the respective measured radial velocities and the respective locating angles, and the individual indicator values are calculated based on the angle measurements that are corrected by the misalignment errors.

6. A radar sensor for a motor vehicle, comprising:
    a transmitting and receiving unit; and
    a control and evaluation device configured to detect angle measuring errors in an angular-resolution radar sensor of the motor vehicles, the control and evaluation device configured to:
        for each of a plurality of stationary radar targets:
            measure a respective radial velocity and at least one respective locating angle;

calculate a respective expected value of the radial velocity using the respective measured locating angle;

compare the respective expected value to the respective measured radial velocity; and calculate an individual indicator value, which indicates a difference of the respective measured radial velocity from the respective expected radial velocity;

subject the individual indicator values to angle-dependent scaling by respective scaling values determined as a function of at least one considered angular direction such that, for at least any two of the individual indicator values that correspond to different ones of the stationary radar targets that are located at different relative angles relative to the motor vehicle with respect to a first of the at least one considered angular direction, but have the same relative angles relative to the motor vehicle in all other angular directions, the scaling values used for the scaling of the two individual indicator values are different than each other due to a difference between the relative angles of the respective stationary radar targets, with respect to the first of the at least one considered angular direction, to which the two individual indicator values correspond, the scaling thereby compensating for angular dependence of distortive angle errors; and calculate an indicator of the angle measuring error from the scaled individual indicator values.

* * * * *